US011145914B2

(12) United States Patent
     Damgaard

(10) Patent No.: US 11,145,914 B2
(45) Date of Patent: Oct. 12, 2021

(54) MODEL BASED MONITORING OF BATTERY SYSTEM

(71) Applicant: VESTAS WIND SYSTEMS A/S, Aarhus N (DK)

(72) Inventor: Chris Damgaard, Herning (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/100,551

(22) Filed: Nov. 20, 2020

(65) Prior Publication Data

US 2021/0151811 A1    May 20, 2021

(30) Foreign Application Priority Data

Nov. 20, 2019    (DK) .......................... PA 2019 70705

(51) Int. Cl.
  *H01M 10/48*    (2006.01)
  *H01M 10/613*   (2014.01)
  (Continued)

(52) U.S. Cl.
  CPC ............. *H01M 10/482* (2013.01); *F03D 9/11* (2016.05); *F03D 9/25* (2016.05); *H01M 10/46* (2013.01);
  (Continued)

(58) Field of Classification Search
  CPC ............. H01M 10/482; H01M 10/633; H01M 10/486; H01M 10/627; H01M 2200/10;
  (Continued)

(56) References Cited

U.S. PATENT DOCUMENTS 7,569,354 B2 *  8/2009  Okano ................ G01N 33/566
                                          435/7.1
7,646,176 B2 *  1/2010  Yamamoto .......... G01R 31/392
                                          320/150
(Continued)

FOREIGN PATENT DOCUMENTS

JP    2016031876 A    3/2016
KR    102020569 B1    9/2019
(Continued)

OTHER PUBLICATIONS

Danish Patent and Trademark Office 1st Technical Examination for Application No. PA 2019 70705 dated May 15, 2020.
(Continued)

*Primary Examiner* — M Baye Diao
(74) *Attorney, Agent, or Firm* — Patterson + Sheridan, LLP

(57)    ABSTRACT

A battery system for storing electric energy, e.g. from a wind turbine. Battery modules are distributed in a housing and cooled by a housing cooling system. A monitoring algorithm receives input data from temperature and current sensors in battery cells from each of the battery modules, a state of a cooling system in each of the battery modules, a state of the housing cooling system such as fan rotation speed, and auxiliary inputs such as an ambient temperature. The monitoring algorithm processes the input data according to a predetermined model based on knowledge about the battery system. The model based estimated temperature within a specific battery cell is compared with the measured temperature to determine whether an abnormal operation exists.

15 Claims, 3 Drawing Sheets

(51) Int. Cl.

| | | |
|---|---|---|
| *H01M 10/627* | (2014.01) | |
| *H01M 10/633* | (2014.01) | |
| *F03D 9/11* | (2016.01) | |
| *F03D 9/25* | (2016.01) | |
| *H01M 10/46* | (2006.01) | |
| *H02J 7/00* | (2006.01) | |

(52) U.S. Cl.
CPC ....... *H01M 10/486* (2013.01); *H01M 10/613* (2015.04); *H01M 10/627* (2015.04); *H01M 10/633* (2015.04); *H02J 7/0013* (2013.01); *H02J 7/0047* (2013.01); *F05B 2220/706* (2013.01); *F05B 2260/42* (2013.01); *H01M 2200/10* (2013.01); *H01M 2220/10* (2013.01); *H02J 2300/28* (2020.01)

(58) Field of Classification Search
CPC .............. H01M 10/46; H01M 10/613; H01M 2220/10; H02J 7/0047; H02J 7/0013; H02J 2300/28; F03D 9/25; F03D 9/11; F05B 2260/42; F05B 2220/706
USPC .......................................................... 320/101
See application file for complete search history.

(56) References Cited

U.S. PATENT DOCUMENTS

| | | | | |
|---|---|---|---|---|
| 8,629,646 B2* | 1/2014 | Bullen | ................... | H02J 13/00 |
| | | | | 320/101 |
| 9,197,069 B2* | 11/2015 | Alston | ................ | H02M 7/7575 |
| 9,329,239 B2* | 5/2016 | Kunimitsu | ............ | H02J 7/0021 |
| 9,553,459 B2* | 1/2017 | Mack | ....................... | H02J 50/80 |
| 9,722,443 B2* | 8/2017 | Ishida | ................ | H01M 10/441 |
| 9,893,394 B2* | 2/2018 | Shin | ...................... | B60L 3/0046 |
| 10,059,222 B2* | 8/2018 | He | ........................... | B60L 58/26 |
| 10,566,805 B2* | 2/2020 | Becker | ................ | H01M 10/635 |
| 10,895,247 B2* | 1/2021 | Thomsen | ................ | F03D 80/50 |
| 2008/0280192 A1 | 11/2008 | Drozdz et al. | | |
| 2011/0156618 A1* | 6/2011 | Seo | ...................... | H01M 10/425 |
| | | | | 318/3 |
| 2013/0234654 A1* | 9/2013 | Tsuchiya | ................. | H02J 3/381 |
| | | | | 320/107 |
| 2014/0306645 A1* | 10/2014 | Salmond | ................ | B63H 21/00 |
| | | | | 320/101 |
| 2015/0280294 A1* | 10/2015 | Shin | ......................... | B60L 3/12 |
| | | | | 429/50 |
| 2016/0079633 A1 | 3/2016 | Wahlstrom et al. | | |
| 2016/0124052 A1 | 5/2016 | Inguva et al. | | |
| 2016/0190833 A1 | 6/2016 | Roumi et al. | | |
| 2016/0315363 A1* | 10/2016 | Esteghlal | ............ | H01M 10/482 |
| 2017/0365893 A1 | 12/2017 | Kim et al. | | |
| 2018/0143257 A1 | 5/2018 | Garcia et al. | | |

FOREIGN PATENT DOCUMENTS

| | | | |
|---|---|---|---|
| WO | 2011075080 A1 | 6/2011 | |
| WO | WO-2015105523 A1 * | 7/2015 | ............ C12M 41/12 |

OTHER PUBLICATIONS

European Search Report for Application No. 20207775.6-1108 dated Apr. 14, 2021.

* cited by examiner

MODEL BASED MONITORING OF BATTERY SYSTEM

FIELD OF THE INVENTION

The present invention relates to the field of electric energy storage, more specifically to the field of electric battery systems with high capacity e.g. for renewable energy sources. More specifically, the invention relates to a model based approach for monitoring battery systems for improved battery life-time.

BACKGROUND OF THE INVENTION

Re-chargeable batteries, such as Li-ion batteries, normally operate with a battery management system having a fixed temperature limit for deciding whether normal operation can be maintained, or if exceeded, charging or discharging of the battery is stopped. This may be sufficient to ensure safe operation without permanent damage of battery cells, but it is not optimal with respect to life-time of the batteries or with respect to operating expenses.

This problem is especially pronounced in case of large battery systems with a high number of modules each having a stack of battery cells. Such systems may be used for storing electric energy from renewable energy sources, such as photovoltaic panels or wind turbines each with a capacity of several MW.

SUMMARY OF THE INVENTION

Thus, according to the above description, it is an object of the present invention to provide a battery system which is capable of operating with an improved life-time and reduced operating expenses compared to traditional battery systems.

In a first aspect, the invention provides a battery system arranged to store electric energy, the battery system comprising a plurality of battery modules each comprising
   a plurality of re-chargeable battery cells in a predetermined spatial configuration,
   a plurality of temperature sensors arranged to sense temperatures at respective positions of the battery module,
   a plurality of current sensors arranged to sense charge or discharge current at least at a plurality of battery cells, and
   a battery module cooling system arranged to provide cooling to the battery module, wherein the battery module cooling system has a plurality of states,
a housing in which the plurality of battery modules are spatially distributed in a predetermined spatial configuration,
a housing cooling system arranged to provide cooling to the plurality of battery modules in the housing, wherein the housing cooling system has a plurality of states, and
a battery monitoring system comprising a processor system arranged to execute a monitoring algorithm, wherein the battery monitoring system is arranged to receive input data from at least:
   said plurality of temperature sensors,
   said plurality of current sensors,
   said battery module cooling systems with at least one parameter indicative of their respective states,
   said housing cooling system with at least one parameter indicative of its state, and
   one or more auxiliary inputs,
wherein the monitoring algorithm is arranged to
process at least a part of said input data according to a predetermined model based on knowledge about the battery cells, the battery module cooling systems, the housing cooling system, and on said predetermined spatial configurations of the battery cells and the battery modules,
generate an estimated temperature at a predetermined position within a battery cell or battery module in response to said predetermined model,
determine a difference between said estimated temperature and a measured temperature at said predetermined position, and
generate an output indicating if said difference exceeds a predetermined threshold.

Such battery system is advantageous, since the model based monitoring allows alarming of various faults in the system at an early state to allow predictive maintenance. This is possible due to the model-based approach for monitoring temperatures taking into account input data so as to reflect the actual operating conditions of the entire battery system. The estimated temperature is based on a large number of input data measured for the actual operating conditions of the battery system, and even though a battery cell temperature is well below a critical limit, the measured temperature can be different from the expected under the actual operating conditions, and this can be taken as an early warning of a problem. Since it is known that life-time of re-chargeable battery cells depends on the operating conditions, among others also the temperature during the charge/discharge cycles, and the charge/discharge depth. With the proposed model-based monitoring of temperatures, it can be ensured that otherwise hidden problems can be detected and solved in time, and therefore the battery cells will operate at the most suitable temperature, thus providing a higher battery life-time.

With only a fixed temperature limit for each battery cell, as in the prior art, it will not be possible to detect e.g. a defect cooling fan in the housing cooling system or in the battery module cooling system, before the battery cell will be pushed to its temperature limit under certain conditions. However, due to the missing cooling air the battery cell may be operated for a long period of time close to its temperature, thereby significantly reducing the overall life-time of the battery cell. Furthermore, with a fixed temperature limit, special operating conditions, such as a high ambient temperature, may cause a partial or complete shut down of the battery system if a cooling fan is defect.

Thus, by the model based monitoring, it is possible to take into account several factors known to influence operation of the battery cells during charging and discharging. The model may especially be trained with real-life data for a system with similar battery cells, module and housing configuration, cooling systems etc. Hereby, the normal behaviour of e.g. temperature of each battery cell can be learned by the model, and with such training, even small deviations from normal behaviour can be detected.

In some embodiments, the model is split into two parts or levels: a battery module part and a system part, serving to detect abnormalities in the battery modules and at the overall housing level, respectively.

If the system has e.g. 10-100 or more identical battery modules, one single battery module model can be determined, but copied for the actual number of battery module each trained with individual data for the actual spatial position of the module in the housing. Hereby, location specific air cooling properties in the housing can be taken account for each individual battery module, hereby allowing an even more specific monitoring of any abnormal behaviour of each single battery module in spite the fact that battery module cooling systems can be expected to operate differently in battery modules with significantly different positions within the housing, thus causing different air cooling from the housing cooling system. As an example, this can allow detection of an abnormal high temperature in a battery module, e.g. due to a broken cooling fan in this module, in spite the absolute temperature in this module being lower than in other modules. This allows repair of the fan before life-time of the battery cells in the module is reduced, and before the missing cooling will cause a breakdown.

The system part of the model can be used e.g. to detect abnormalities, e.g. due to faults in the housing cooling system. If such system part model is trained with real-life data, e.g. using auxiliary input data such as an ambient temperature, it is possible to reveal defects in the housing cooling system, which will cause a slightly higher temperature in all battery modules than expected with the actual housing cooling state and ambient temperature, and a predictive repair of the housing cooling system can be initiated. As another example, one out of a number of cooling fans in the housing may be defect, and this may be detected by a higher than expected temperature in battery modules located near the defect cooling fan, whereas battery modules located far from the defect fan may operate as expected.

Thus, the monitoring system may be designed to detect rather specific technical problems in a specific system and to generate alarms to allow predictive maintenance for solving these problems. This helps to improve battery life-time, reduces down time of the battery system, and thereby altogether reduces operating expenses of the battery system.

In the following, preferred embodiments and features will be described.

In preferred embodiments, the monitoring algorithm comprises a first part arranged to process at least a part of said input data according to a predetermined model of one of said plurality of battery modules, and to
  generate a first estimated temperature at a predetermined position within a battery cell or battery module in response to said first predetermined model,
  determine a difference between said first estimated temperature and a measured temperature at said predetermined position, and
  generate a first output indicating if said difference exceeds a predetermined threshold. In such embodiments, it is possible to detect abnormal function in the battery module, e.g. a malfunction of the battery module cooling system, or increased battery temperature due to increased internal resistance in a battery cell due to battery cell wear out. Especially, the first output may serve to indicate an abnormality within the battery module cooling system. Preferably, the monitoring algorithm comprises individual predetermined models for each of the plurality of battery modules in the battery system, especially respective outputs from the individual monitoring algorithms may indicate one or more abnormalities within respective ones of the plurality of battery modules. In some embodiments, all of the plurality or battery modules are identical modules, and thus the individual monitoring algorithms may likewise be identical in algorithm structure, but parameters of the algorithms may be individual, e.g. trained with real life data taking into account the specific spatial location of the battery module in the housing, e.g. also and its electrical connection or other specific details related to the individual battery module. This allows improved detection of any abnormal function of a specific battery module.

In preferred embodiments, the monitoring algorithm comprises a second part arranged to process at least a part of said input data according to a second predetermined model of said plurality of battery modules spatially distributed in said predetermined spatial configuration, and to
  generate a second estimated temperature at a predetermined position within a battery cell or battery module in response to said second predetermined model,
  determine a difference between said first estimated temperature and a measured temperature at said predetermined position, and
  generate a second output indicating if said difference exceeds a predetermined threshold. In such embodiments, it is possible to detect abnormal function in the e.g. the housing cooling system, and thus in preferred embodiments, the second output serves to indicate an abnormality within the housing cooling system.

In preferred embodiments, the monitoring algorithm comprises both of the first and second parts as mentioned above. Hereby, it is possible to determine abnormalities at the battery module level as well as at the overall system level.

The at least one parameter indicative of the state of the housing cooling system comprises at least one of: data indicative of a rotation speed of a fan serving to circulate cooling air in the housing, data indicative of a cooling level of a cooling unit, and data indicative of an air temperature at an air inlet of the cooling system. Further, the at least one parameter may comprise data indicative of rotation speed of respective fans serving to circular air in the housing. Even further, the housing cooling system may comprise a heating unit to allow heating of the housing, and wherein said at least one parameter indicative of the housing cooling system may comprise a heating level of such heating unit.

The one or more auxiliary inputs may comprise at least one of: data indicative of an ambient temperature, data indicative of one or more temperatures inside the housing, and data indicative of a temperature of a power converter involved in charging or discharging of the plurality of battery modules. Especially the ambient temperature may be used as an indication of a general condition which influences the overall operating condition of the battery modules in the housing. It to be understood that further measurable auxiliary input data can be used. Examples are electric currents and/or voltages at various points in the electric network connecting the battery models. Furthermore, additional data or measured values may be input to provide even further information to the battery monitoring algorithm about the function of the battery system. Still further, the monitoring algorithm is preferably arranged to track the number of charging/discharging of the battery cells as well as charge/discharge depth, since these parameters are known to influence behaviour for the battery cells. Thus, preferably the predetermined model is trained to take into account this change in behaviour over time in order to provide the best possible estimated temperature during the entire life-time of the batteries.

The battery monitoring system may be arranged to generate an alarm, in case said output indicates that said difference exceeds the predetermined threshold. Especially, the monitoring algorithm may be designed to transmit an alarm to an operator of the battery system, e.g. an operator of a wind turbine plant, so as to allow the operator to initiate predictive maintenance. Especially, the battery monitoring system may be arranged to generate a plurality of different alarm levels. Specifically, one of the plurality of different alarm levels may comprise an alarm level indicating the need for a predictive maintenance of one or more of the plurality of battery modules. Specifically, one of the plurality of different alarm levels may comprise an alarm level indicating the need for a predictive maintenance of the housing cooling system.

The predetermined model may comprise at least one of: a Multiple Linear Regression (MLR) model or neural network or an Auto Regressive Moving Average (ARMA) model. Various implementation of such model are known by the skilled person. Especially, the predetermined model may be trained with data from a normally operating battery system with a similar configuration of battery modules, housing with a similar predetermined spatial configuration of battery modules, and with a similar housing cooling system. Specifically, the training data are input data from a battery system with an identical configuration as the battery system in question.

The predetermined model may involve a machine learning or Artificial Intelligence (AI) element, such as comprising a neural network, capable of learning a normal behaviour of the battery system by a training procedure. Especially, the predetermined model may be trained with data from a battery system with a similar configuration of battery modules, housing with a similar predetermined spatial configuration of battery modules, and with a similar housing cooling system. Specifically, the training data are input data from a battery system with an identical configuration as the battery system in question. Hereby, the predetermined model can be very sensitive to even small deviations from expected behaviour, thereby allowing identification of problems at an early state. It is to be understood that the predetermined threshold setting for determining if the measured temperature deviates from the model based estimated temperature can be set to be small or large depending on which sensitivity to be expected by the monitoring system.

The housing may be in the form of an enclosure with a service entrance, e.g. a door, and an inlet opening for circulation of air e.g. connected to an air inlet of the housing cooling system. The housing may be formed by a standard size container, or the housing may be a specifically designed housing comprising floor, walls and roof.

Battery modules may be contained in a rack containing a series or a parallel connection, or both, of a number of battery modules. Each battery module may contain such as 2-50 battery cells each having at least one built-in current sensor and temperature sensor. Further, the battery module may comprise one or more general temperature sensors e.g. at various positions in the rack, to sense a temperature indicative of the overall temperature at the position of the rack.

The battery module cooling system may comprise one or both of: a liquid cooling system, and an air cooling system with one or more motor driven fans. The state of the battery module cooling system may be described by a code indicating which of e.g. 2-100 states of cooling the cooling system is in. The state of the battery module cooling system may also be described by the rotation speed of the one or more motor driven fans.

The housing cooling system may comprise one or both of: a liquid cooling system, and an air cooling system with one or more motor driven fans. The state of the housing cooling system may be described by a code indicating which of e.g. 2-100 states of cooling the cooling system is in. The state of the battery module cooling system may also be described by the rotation speed of the one or more motor driven fans, and/or a cooling level setting of a liquid cooling unit.

In some embodiments, the housing cooling system is provided as a part of a complete Heat and Ventilation and Air Condition (HVAC) system which is also arranged to provide heat to the interior of the housing to provide a suitable temperature for optimal operation of the battery cells at low ambient temperatures.

The battery monitoring system may have its processor system connected to receive the input data by means of a wired or a wireless data connection. Especially, each battery module may have a wired or wireless connection to a data concentrator unit in the housing which can transmit all input data from the housing in a wired or wireless connection to the processor system, e.g. a computer system, which may be located in the housing or external to the housing at a distance from the housing.

The battery monitoring system may operate continuously on incoming input data, or at least with interval of up to a few seconds. Alternatively, the system may collect input data over a period of time before executing the monitoring algorithm at regular intervals.

Based on the generated output indicating if the calculated difference exceeds the predetermined threshold, the battery monitoring system is arranged to generate an alarm, e.g. to service personnel. Especially, the alarm may comprise indication of one or more specific technical problems that may require predictive maintenance. In some embodiments, the battery monitoring system is arranged to detect a problem with the battery module cooling system in a specific battery module, and to generate an alarm with information about the specific battery module. In some embodiments, the battery monitoring system is arranged to detect a problem with the housing cooling system, and to generate an alarm with information about this problem.

It is to be understood that the monitoring algorithm may be designed to estimate temperature at a large number of battery cells, e.g. at least one battery cell in all of the battery modules, or even every single battery cell. Further, temperatures may be estimated and compared with measure values also at other positions, e.g. within an enclosure of the battery modules, or a various positions within the housing. Thus, the model can be rather complex involving hundreds or thousands of single input data values, and with a large number of estimated temperatures being compared with measured temperatures.

In some embodiments, the battery cells may be Li-ion type cells, however, other battery cell technologies may be used.

The total energy capacity of the plurality of battery modules may be such as 100 kWh to 100 MWh.

In a second aspect, the invention provides a wind turbine system comprising
    at least one wind turbine comprising a rotor blade system, an electric generator connected to be driven by the rotor blade system, a tower with a nacelle for housing the electric generator, and an electric output, and
    a battery system according to the first aspect, wherein the electric output from the at least one wind turbine is connected to the battery system, so as to allow charging of at least one of the plurality of battery modules.
    In some embodiments, the output from the battery monitoring system may comprise an alarm to a Supervisory Control And Data Acquisition (SCADS) system of the one or more wind turbine or plant of wind turbines, in case an abnormality has been detected. E.g. such alarm may comprise a specific predictive maintenance information to allow maintenance of one or more specific elements of the battery system.

In some embodiments, the wind turbine system comprises a plurality of battery systems according to the first aspect.

In some embodiments, a plant of a plurality of wind turbines are connected to a network of a plurality of battery systems according to the first aspect.

In a third aspect, the invention provides a method for monitoring a battery system of a plurality of battery modules with re-chargeable battery cells and each having a battery module cooling system, wherein the plurality of battery modules are spatially distributed in a predetermined spatial configuration in a housing with a housing cooling system with a plurality of states, the method comprising:

executing a monitoring algorithm on a processor system,
receiving input data from a plurality of temperature sensors arranged at respective positions of each battery module,
receiving input data from a plurality of current sensors arranged to sense charge or discharge current at least at a plurality of battery cells,
receiving input data from the battery module cooling systems with at least one parameter indicative of their respective states,
receiving input data from the housing cooling system with at least one parameter indicative of its state,
receiving input data one or more auxiliary inputs,
processing at least a part of said input data according to a predetermined model based on knowledge about the battery cells, the battery module cooling systems, the housing cooling system, and on said predetermined spatial configurations of the battery cells and the battery modules,
generating an estimated temperature at a predetermined position within a battery cell or battery module in response to said predetermined model,
determining a difference between said estimated temperature and a measured temperature at said predetermined position, and
generating an output indicating if said difference exceeds a predetermined threshold.

It is to be understood that the same advantages and preferred embodiments and features apply for the second and third aspects, as described for the first aspect, and the aspects may be mixed in any way.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
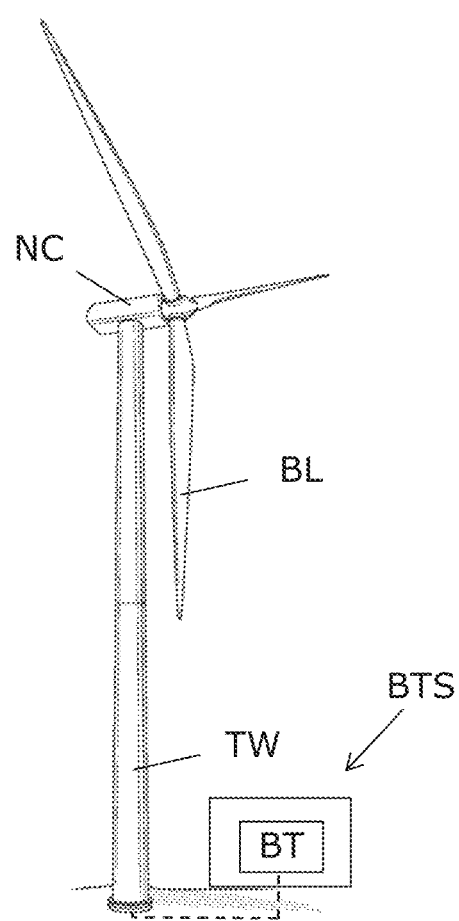
FIG. 1 illustrates a wind turbine system embodiment with a wind turbine connected to a battery for energy storage.

FIG. 1 illustrates a wind turbine system embodiment. The wind turbine has typically two or three rotor blades BL for driving an electric generator located inside the nacelle NC on top of a tower TW. Typically, a power converter system in a wind turbine can be placed up-tower or down tower. Wind turbines may generate an electric power of at least 1 MW, such as 2-10 MW, or more. Here, the wind turbine is connected to an electric energy storage in the form of a battery system BTS with batteries BT inside a housing, here shown on the ground at a distance from the wind turbine tower and connected to the batteries BT via a power cable (dashed line).

Figure 2:
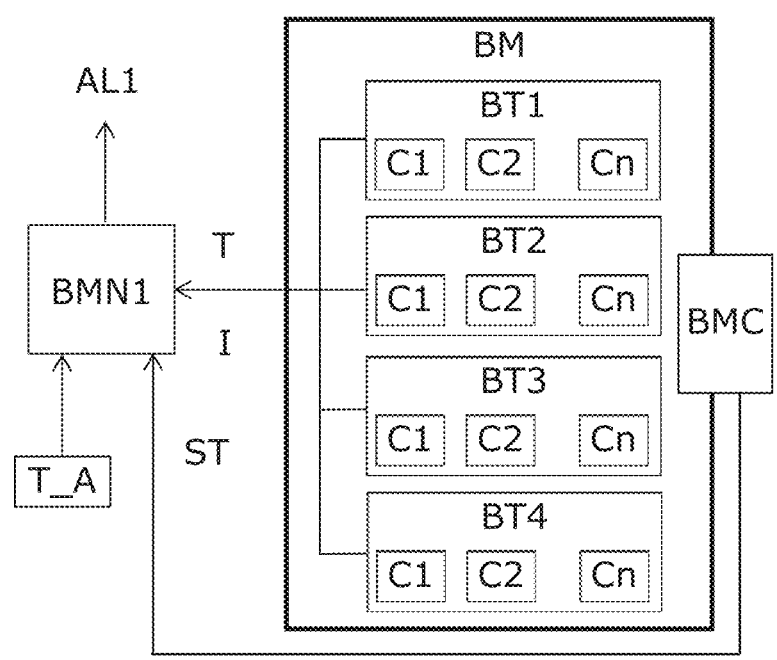
FIG. 2 illustrates a block diagram of one embodiment.

FIG. 2 shows a block diagram of a battery monitoring algorithm embodiment BMN1 which serves to monitor operation of a battery module BM which comprises four battery packs BT1, BT2, BT3, BT4 each formed by a number of battery cells C1, C2, Cn. Each battery pack BT1, BT2, BT3, BT4 has at least one temperature sensor arranged to sense a temperature of one or more of the battery cells C1, C2, Cn, as well as a current sensor to sense charge/discharge current. Input data T from the temperature sensors as well as input data from the current sensors I are applied to the battery monitoring algorithm BMN1. Knowledge about the position of the battery packs BT1, BT2, BT3, BT4 and battery cells C1, C2, Cn within the module BM is also applied to the battery monitoring algorithm BMN1, since this plays a role with respect to the performance of the individual battery cells C1, C2, Cn, as the cooling air in the module may not be evenly distributed throughout the module. This also applies, in case the module cooling is based on liquid cooling.

The battery module BM may be arranged in a rack system with a battery module cooling system BMC, e.g. an air flow based cooling system with one or more motor driven fans to provide cooling air to the battery packs BT1, BT2, BT3, BT4 in the rack, e.g. dependent on one or more operating parameters which are used to control a state ST of the battery module cooling system BMC, e.g. the rotation speed of the one or more fans. The state ST, e.g. fan rotation speed, of the battery module cooling system BMC is also applied to the battery monitoring algorithm BMN1.

As shown, the battery monitoring algorithm BMN1 also receives an input regarding the ambient temperature T_A, and altogether all input data are processed by a predetermined model which generates an estimated temperature of one or more battery cells C1, C2, Cn in the battery module BM, and by comparing with the measured temperature at the same one or more battery cells C1, C2, Cn, it is determined if a difference between measured and estimated temperature exceeds a predetermined threshold or not. In case the difference exceeds the threshold set, it can be taken as a sign of an abnormal behaviour of the battery module, and an alarm AL1 can be generated and transmitted to a person or entity predictive maintenance, e.g. along with information exactly about which temperature(s) deviating from the expected and e.g. a proposal of what might be the actual problem. Such problem could be a malfunction of the battery module cooling system BMC.

With the extensive amount of input data, the battery monitoring algorithm BMN1 may be trained with input data for a normally functioning battery module with the specific design of the battery module BM, thus allowing the battery monitoring algorithm BMN1 to sense even small deviations from normal behaviour and thus allow predictive maintenance before the fixed temperature limit for one of the battery cells C1, C2, Cn is exceeded, thus causing degraded performance or even a complete shutdown of the entire battery module BM. E.g. malfunction of the battery module cooling system BMC can be detected at an early state, thus ensuring that the battery cells C1, C2, Cn in the module BM always operate within an optimal temperature range which increases life-time of the battery cells C1, C2, Cn.

The battery monitoring algorithm BMN1 preferably involves an algorithm such as an ARMA and/or an MLR model or a model based on a neural network algorithm or AI algorithm. The model is preferably trained with input data corresponding to data T, I, T_A, ST for a normally functioning battery module BM. Preferably, the training data includes long term data to allow the model to learn ageing effects of the battery cells C1, C2, Cn.

If a high capacity battery system is built from a large number of identical battery modules BM, the battery monitoring algorithm BMN1 only needs to be trained with data for normal behaviour once, and it can then be copied to allow monitoring at battery module level for a plurality of battery modules BM. This may especially be the case, if the battery monitoring algorithm BMN1 is arranged to receive input data from one or more temperature sensor placed to sense a general temperature immediately outside the battery module BM, e.g. at an air inlet of the battery module cooling system BMC or with one or more temperature sensors placed on an outer surface of a casing of the battery module BM.

Figure 3:
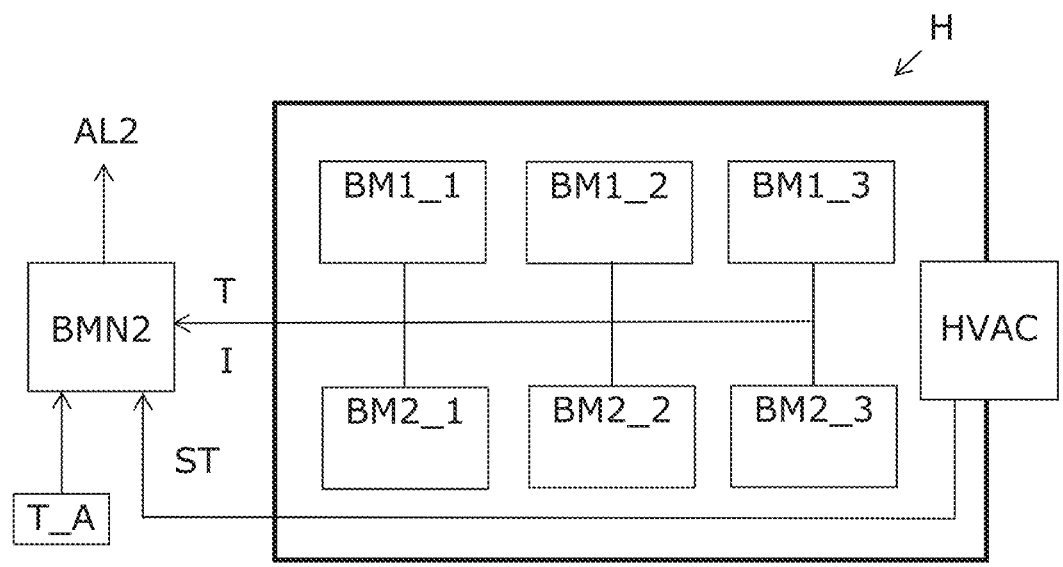
FIG. 3 illustrates a block diagram of another embodiment.

FIG. 3 shows an embodiment of a battery monitoring algorithm BMN2 serving to monitor a battery system on a system level. The battery system comprises a number of battery modules BM1_1, BM1_2, BM1_3, BM2_1, BM2_2, BM2_3, shown to be spatially distributed within a housing H, e.g. a standard 20 or 40 foot container. Each of the battery modules BM1_1, BM1_2, BM1_3, BM2_1, BM2_2, BM2_3 provides a number of temperature input data T from the battery cells, as well as current data I from the battery cells, as described above for the battery module BM in FIG. 2. These data T, I as well as an ambient temperature T_A are applied to the battery monitoring algorithm BMN2.

Further, the housing H has a housing cooling system HVAC which can provide cooling to the battery modules by a cooling unit serving to cool air from an air inlet and distribute the cooled air inside the housing H by means of one or more motor driven fans so as to cool the battery modules. The function of the housing cooling system HVAC can be described by its state ST, e.g. the state ST may be indicated by rotation speed of the one or more fans, as well as levels setting of the cooling unit. The housing cooling system HVAC may also be capable of providing heated air to heat the battery modules inside the housing H, if necessary under certain ambient temperature conditions. The housing cooling system HVAC is preferably controlled in response to feedback from the battery modules BM1_1, BM1_2, BM1_3, BM2_1, BM2_2, BM2_3 and/or temperature sensors inside the housing H to provide a suitable temperature for optimal operation of the battery cells. The state ST of the housing cooling system HVAC is applied to the battery monitoring algorithm BMN2 which, for a large system of e.g. 50-100 battery modules, may receive thousands of single temperature and current data either by means of wired or wireless communication, or a combination thereof.

With the extensive amount of input data, the battery monitoring algorithm BMN2 may be trained with input data for a normally functioning battery system with the specific design of the battery system, i.e. the same battery modules in the same spatial configuration etc. Hereby, the battery monitoring algorithm BMN2 allows detection of even small deviations from normal behaviour and thus allow predictive maintenance before the fixed temperature limit for even one of the battery cells C1, C2, Cn is exceeded, thus causing degraded performance or even a complete shutdown of the entire battery system. E.g. malfunction of the housing cooling system HVAC can be detected at an early state, thus ensuring that the battery cells C1, C2, Cn in all battery modules BM1_1, BM1_2, BM1_3, BM2_1, BM2_2, BM2_3 always operate within an optimal temperature range which increases life-time of the battery cells C1, C2, Cn.

The battery monitoring algorithm BMN2 preferably involves an algorithm such as an ARMA and/or an MLR model or a model based on a neural network algorithm or AI algorithm. The model is preferably trained with input data corresponding to data T, I, T_A, ST for a normally functioning battery system with battery modules BM1_1, BM1_2, BM1_3, BM2_1, BM2_2, BM2_3 in the same specified spatial configuration within the housing H. Preferably, the training data includes long term data to allow the model to learn ageing effects of the battery cells C1, C2, Cn.

If a high capacity battery system is built from a number of identical battery system as the one example shown in FIG. 3, the battery monitoring algorithm BMN2 only needs to be trained with data for normal behaviour once, and it can then be copied to allow monitoring at battery system level for a plurality of battery systems.

In preferred embodiments, the battery system has a battery monitoring algorithm which comprises both of the battery monitoring algorithm part BMN1 covering the battery module level as described and illustrated in FIG. 2 and the battery monitoring algorithm part BMN2 covering the battery system level as described and illustrated in FIG. 3. Thus, even for very high capacity battery plant having a plurality of battery systems, as in the example in FIG. 3 with a plurality of battery modules as in the example of FIG. 2, only two types of monitoring algorithms BMN1, BMN2 needs to be trained in order to provide a battery monitoring system for a very high capacity battery plant which is capable of detecting possible errors on a battery system and a battery module level.

Figure 4:
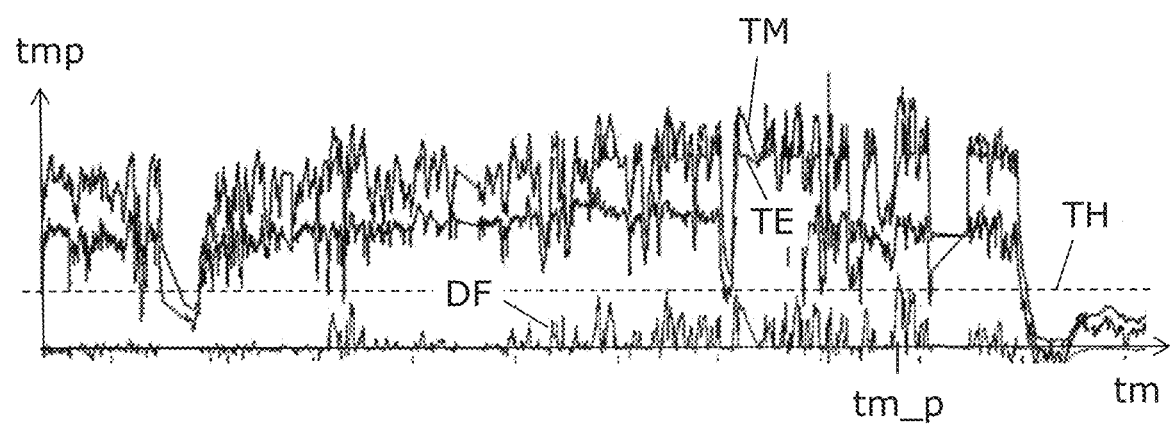
FIG. 4 illustrates a graph with an example of estimated and measured temperatures as well as the temperature difference over time.

FIG. 4 shows a graph of temperature tmp versus time tm for an example with a measured temperature TM and a model-based estimated temperature TE along with the difference DF, i.e. DF=TE−TM (or DF=TM−TE). The dashed horizontal line indicates a predetermined threshold TH for the difference DF, and in case the threshold TH is exceeded, an alarm can be generated since the deviation from the expected behaviour is then large enough to indicate a potential problem. In the shown example, the difference DF is well below the threshold TH, however at time tm_p, the difference DF exceeds the threshold TH temperature, thus indicating a problem which can be taken into account by predictive maintenance.

Figure 5:
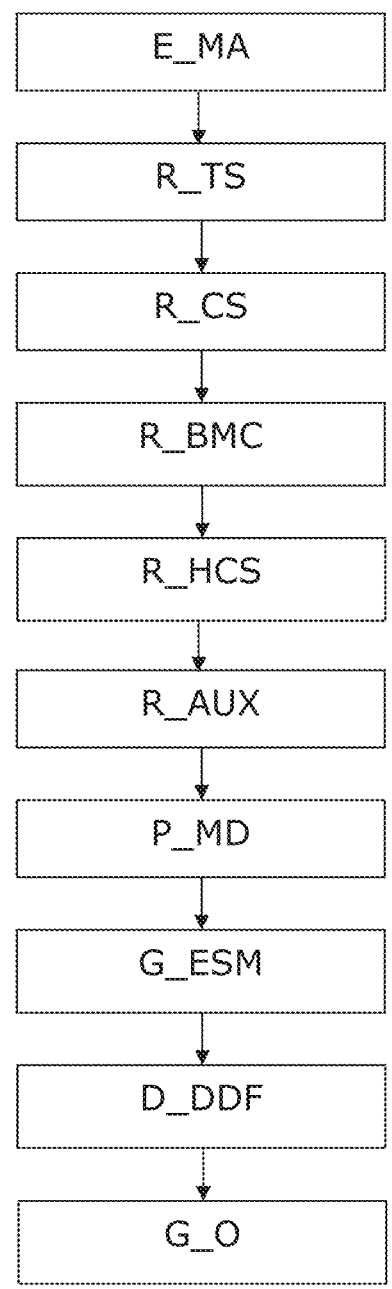
FIG. 5 illustrates steps of a method embodiment.

FIG. 5 illustrates steps of an embodiment for a method for monitoring a battery system of a plurality of battery modules with re-chargeable battery cells and each having a battery module cooling system, wherein the plurality of battery modules are spatially distributed in a predetermined spatial configuration in a housing with a housing cooling system with a plurality of states.

The method comprises executing E_MA a monitoring algorithm on a processor system. The monitoring algorithm involves receiving R_TS input data from a plurality of temperature sensors arranged at respective positions of each battery module, receiving R_CS input data from a plurality of current sensors arranged to sense charge or discharge current at least at a plurality of battery cells, receiving R_BMC input data from the battery module cooling systems with at least one parameter indicative of their respective states, receiving R_HCS input data from the housing cooling system with at least one parameter indicative of its state, receiving R_AUX input data one or more auxiliary inputs, such as an ambient temperature. Finally processing P_MD at least a part of said input data according to a predetermined model based on knowledge about the battery cells, the battery module cooling systems, the housing cooling system, and on said predetermined spatial configurations of the battery cells and the battery modules. The predetermined model then generates G_ESM an estimated temperature at a predetermined position within a battery cell or battery module in response to said predetermined model, determining D_DFF a difference between said estimated temperature and a measured temperature at said predetermined position, and generating G_O an output if said difference exceeds a predetermined threshold and otherwise no output is generated. The output may be used to generate an alarm to initiate a predictive maintenance. E.g. the predetermined position may be the position of a specific temperature sensor in a specific battery cell of a battery module.

The monitoring algorithm may be set up to run continuously on continuously incoming input data, or it may be set up to run only with regular time intervals or it may be set up to run only upon request.

The method may comprise an initial step of training a predefined model algorithm, such as a predefined model algorithm involving an ARMA or an MLR model or a neural network or AI algorithm to arrive at the predetermined model to be used for the monitoring algorithm. The training data are preferably real-life data for normal operation obtained from a battery system similar or identical to the system to be monitored. By the training data, parameters of the predefined model algorithm are adjusted, so the resulting model reflects the normal behaviour of the battery system, and thus after training, the predefined model is turned into the predetermined model to be used for the monitoring algorithm. Preferably, the training data over a rather long period of time to be able for the model to be trained with input data covering the normal change of the battery cell behaviour dependent on the number of charges/discharges and charge/discharge depth. If a number of identical battery systems are produced, the same monitoring algorithm with the trained model can be used for monitoring all battery systems. Thus, the rather complex training procedure only needs to be performed once a new battery system is designed and then be used for a large number of identical battery systems with the advantage of increased battery life-time compared to systems with existing monitoring systems.

To sum up: the invention provides a battery system for storing electric energy, e.g. from a wind turbine. Battery modules are distributed in a housing and cooled by a housing cooling system, e.g. with a fan generating cooling air around the battery modules. The battery modules, e.g. racks, each has a number of re-chargeable battery cells. A monitoring algorithm receives input data from temperature and current sensors in battery cells from each of the battery modules, a state of a cooling system in each of the battery modules, a state of the housing cooling system such as fan rotation speed, and auxiliary inputs such as an ambient temperature. The monitoring algorithm processes the input data according to a predetermined model based on knowledge about the battery cells, the battery module and housing cooling systems, and on the spatial distribution of the battery cells modules. The algorithm may comprise an ARMA and/or an MLR model or a neural network, and the model is preferably trained with real life input data form a normally functioning battery system. The model based estimated temperature within a specific battery cell is compared with the measured temperature, and if a difference exceeds a threshold, it indicates an abnormal operation, and an alarm or warning about this can be used to initiate predictive maintenance. Compared to a simple fixed temperature limit, problems can be detected and solved at an early state, thus ensuring optimal operating conditions for the batteries, and thus increasing battery life-time.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:
1. A battery system arranged to store electric energy, the battery system comprising:
  a plurality of battery modules, each of the plurality of battery modules comprising:
    a plurality of re-chargeable battery cells in a predetermined spatial configuration;
    a plurality of temperature sensors arranged to sense temperatures at respective positions of the respective battery module of the plurality of battery modules;
    a plurality of current sensors arranged to sense charge or discharge current at least at the plurality of re-chargeable battery cells; and
    a battery module cooling system arranged to provide cooling to the respective battery module of the plurality of battery modules, wherein the battery module cooling system has a plurality of states;
  a housing in which the plurality of battery modules are spatially distributed in a predetermined spatial configuration;
  a housing cooling system arranged to provide cooling to the plurality of battery modules in the housing, wherein the housing cooling system has a plurality of states;
  a battery monitoring system comprising a memory and a hardware processor communicatively coupled to the memory, wherein the battery monitoring system is configured to receive input data from at least:
    said plurality of temperature sensors;
    said plurality of current sensors;
    battery module cooling systems of the plurality of battery modules with at least one parameter indicative of their respective states;
    said housing cooling system with at least one parameter indicative of its state; and
    one or more auxiliary inputs;
  wherein the hardware processor is configured to:
    process at least a part of said input data according to a predetermined model based on knowledge about the plurality of re-chargeable battery cells, the battery module cooling systems of the plurality of battery modules, the housing cooling system, and on said predetermined spatial configurations of the plurality of re-chargeable battery cells and the battery modules;

generate an estimated temperature at a predetermined position within a battery cell or battery module in response to said predetermined model;

determine a difference between said estimated temperature and a measured temperature at said predetermined position; and generate an output indicating if said difference exceeds a predetermined threshold.

2. The battery system according to claim 1, wherein the hardware processor is further configured to process at least a part of said input data according to a first predetermined model of one of said plurality of battery modules, and to:

generate a first estimated temperature at a predetermined position within a battery cell or battery module in response to said first predetermined model;

determine a difference between said first estimated temperature and a measured temperature at said predetermined position; and generate a first output indicating if said difference exceeds a predetermined threshold.

3. The battery system according to claim 2, wherein the first output serves to indicate an abnormality within the battery module cooling system.

4. The battery system according to claim 2, wherein the hardware processor is further configured to generate respective outputs indicating an abnormality within respective ones of the plurality of battery modules.

5. The battery system according to claim 2, wherein the hardware processor is further configured to process at least a part of said input data according to a second predetermined model of said plurality of battery modules spatially distributed in said predetermined spatial configuration, and to:

generate a second estimated temperature at a predetermined position within a battery cell or battery module in response to said second predetermined model;

determine a difference between said first estimated temperature and a measured temperature at said predetermined position; and generate a second output indicating if said difference exceeds a predetermined threshold.

6. The battery system according to claim 5, wherein the second output serves to indicate an abnormality within the housing cooling system.

7. The battery system according to claim 1, wherein said at least one parameter indicative of the state of the housing cooling system comprises at least one of: data indicative of a speed of a fan serving to circulate cooling air in the housing, data indicative of a cooling level of a cooling unit, and data indicative of an air temperature at an air inlet of the housing cooling system.

8. The battery system according to claim 1, wherein said one or more auxiliary inputs comprises at least one of: data indicative of an ambient temperature, data indicative of one or more temperatures inside the housing, and data indicative of a temperature of a power converter involved in charging or discharging of the plurality of battery modules.

9. The battery system according to claim 1, wherein the battery monitoring system is arranged to generate an alarm, in case said output indicates that said difference exceeds the predetermined threshold.

10. The battery system according to claim 9, wherein the battery monitoring system is arranged to generate a plurality of different alarm levels.

11. The battery system according to claim 10, wherein one of the plurality of different alarm levels comprises an alarm level indicating a need for a predictive maintenance of one or more of the plurality of battery modules.

12. The battery system according to claim 1, wherein said predetermined model comprises at least one of: a Multiple Linear Regression model, an Auto Regressive Moving Average model or a neural network model.

13. The battery system according to claim 1, wherein said predetermined model is trained with data from a battery system with a similar configuration of battery modules, housing with a similar predetermined spatial configuration of battery modules, and with a similar housing cooling system.

14. A wind turbine system comprising:

at least one wind turbine comprising a rotor blade system, an electric generator connected to be driven by the rotor blade system, a tower with a nacelle for housing the electric generator, and an electric output; and a battery system according to any of the preceding claims, wherein the electric output from the at least one wind turbine is connected to the battery system, so as to allow charging of at least one of the plurality of battery modules.

15. A method for monitoring a battery system of a plurality of battery modules with re-chargeable battery cells and each having a battery module cooling system, wherein the plurality of battery modules are spatially distributed in a predetermined spatial configuration in a housing with a housing cooling system with a plurality of states, the method comprising:

executing a monitoring algorithm on a processor system;

receiving input data from a plurality of temperature sensors arranged at respective positions of each battery module;

receiving input data from a plurality of current sensors arranged to sense charge or discharge current at least at the re-chargeable battery cells;

receiving input data from the battery module cooling systems with at least one parameter indicative of their respective states;

receiving input data from the housing cooling system with at least one parameter indicative of its state;

receiving input data from one or more auxiliary inputs;

processing at least a part of said input data according to a predetermined model based on knowledge about the re-chargeable battery cells, the battery module cooling systems, the housing cooling system, and on said predetermined spatial configurations of the re-chargeable battery cells and the battery modules;

generating an estimated temperature at a predetermined position within a battery cell or battery module in response to said predetermined model;

determining a difference between said estimated temperature and a measured temperature at said predetermined position; and generating an output indicating if said difference exceeds a predetermined threshold.

* * * * *